(12) United States Patent
Lu et al.

(10) Patent No.: US 6,910,059 B2
(45) Date of Patent: *Jun. 21, 2005

(54) APPARATUS AND METHOD FOR CALCULATING AN EXPONENTIAL CALCULATING RESULT OF A FLOATING-POINT NUMBER

(75) Inventors: Chung-Yen Lu, Taipei (TW); Kuo-Wei Yeh, Miaoli Hsien (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 506 days.

This patent is subject to a terminal disclaimer.

(21) Appl. No.: 10/191,168

(22) Filed: Jul. 9, 2002

(65) Prior Publication Data

US 2004/0010531 A1 Jan. 15, 2004

(51) Int. Cl.$^7$ .................................................. G06F 7/38
(52) U.S. Cl. ...................................... 708/606; 708/277
(58) Field of Search ................................ 708/277, 606

(56) References Cited

U.S. PATENT DOCUMENTS 5,365,465 A * 11/1994 Larson ....................... 708/204
6,178,435 B1 * 1/2001 Schmookler ................ 708/277
6,480,873 B1 * 11/2002 Inoue et al. ................ 708/606

* cited by examiner

Primary Examiner—Chuong Dinh Ngo
(74) Attorney, Agent, or Firm—Merchant & Gould P.C.

(57) ABSTRACT

An apparatus for calculating an exponential calculating result for a base 2 floating-point number comprises a transforming device, K exponential tables and a multiplier. The transforming device receives the floating-point number, transforms the floating-point number to an integer part and a fractional part and outputs the integer part and the fractional part. The fractional part is an N-bit number and divided into K parts which have $N_1, N_2, \ldots, N_K$ bits respectively, wherein $N=N_1+N_2+ \ldots +N_K$. Each of the exponential tables receives one of the K parts divided from the fractional part and outputs a result. The multiplier receives all results from the exponential tables and outputs a mantissa. The integer part outputted form the transforming device is an exponent. The mantissa, the exponent and a sign whose value is 0 is used to represent an exponential calculating result which is represented in the following format: $(-1)^{S_y} \cdot 2^{E_y} \cdot m_y$, where $S_y$ is the sign whose value is 0, $E_y$ is the integer part, $m_y$ is the mantissa and $1 \leq m_y < 2$.

20 Claims, 4 Drawing Sheets

US 6,910,059 B2

APPARATUS AND METHOD FOR CALCULATING AN EXPONENTIAL CALCULATING RESULT OF A FLOATING-POINT NUMBER

BACKGROUND OF THE INVENTION

1. Field of the Invention

The present invention relates in general to an apparatus and a method for exponential computation, and more particularly to an apparatus and method to precisely calculate an exponential calculating result for a base 2 floating-point number.

2. Description of the Related Art

The representation of floating-point numbers is similar to the commonly used scientific notation and consists of two parts, the mantissa M and the exponent. The floating-point number F represented by the pair (M,E) has the value, $$F = M \times \beta^E$$

Where $\beta$ is the base of the exponent.

In an effort to unify methods employed in calculator systems for performing binary floating-point arithmetic, the IEEE in the early 1980's standardized calculater floating-point numbers. Such binary floating-point numbers make possible the manipulation of large as well as small numbers with great precision, and thus are often used in scientific calculations. They typically comprise either single precision format or double precision format, with single precision operating on 32-bit operands and double precision operating on 64-bit operands. Both single and double precision numbers constitute a bit-string characterized by three fields: a single sign bit, several exponent bits, and several fraction or mantissa bits, with the sign bit being the most significant bit, the exponent bits being the next most significant, and the mantissa bits being the least significant.

FIG. 1 is a diagram showing the form of the single format. Since base 2 was selected, a flowing point number F in the single format has the form:

$$F = (-1)^S \cdot 2^{E-127} \cdot (1.f)$$

Where

S=sign bit;

E=8-bit exponent biased by 127;

f=F's 23-bit fraction or mantissa which, together with an implicit leading 1, yield the significant digit field "1.--".

In present day calculators, the calculation of the floating-point is used for almost all kinds of calculations. Calculator efficiency depends on the efficiency of the calculation of the floating-point. For exponential computation of a floating-point number, an exponential table is usually determined in advance. Then, the result is found by looking up the table. However, when using the exponential table, there is a problem of precision. An 8-bit exponential table is quite large. A memory with large size is required to store the 8-bit exponential table. But if an 8-bit exponential table is used for exponential computation of a floating-point number, the precision of the calculating result is not sufficient. Because the mantissa part of the floating-point number has 23 bits, to precisely calculate an exponent of a floating-point number, an 8-bit exponential table is not enough.

SUMMARY OF THE INVENTION

In view of the above, an object of the present invention is to provide an apparatus and method for calculating an exponential calculating result for a base 2 floating-point number to obtain a calculating result with full precision without the need of a large memory.

The present invention provides an apparatus for calculating an exponential calculating result for a base 2 floating-point number wherein the floating-point number is represented in the format of $(-1)^{S_x} \cdot 2^{E_x} \cdot m_x$ and the exponential calculating result Y is represented in the format $(-1)^{S_y} \cdot 2^{E_y} \cdot m_y$, where $S_x$ is a sign of the floating-point number, $S_y$ is a sign of the exponential calculating result, $E_x$ is an exponent of the floating-point number, $E_y$ is an exponent of the exponential calculating result, $m_x$ is a mantissa of the floating-point number, $m_y$ is a mantissa of the exponential calculating result, $1 \leq m_x < 2$ and $1 \leq m_y < 2$, the apparatus comprising: a transforming device for receiving the sign of a floating-point number, the exponent of the floating-point number and the mantissa of the floating-point number, and transforming the floating-point number to an integer part and a fractional part and outputting them, wherein the fractional part is an N-bit number divided into K parts which have $N_1, N_2, \ldots, N_K$ bits respectively, wherein $N = N_1 + N_2 + \ldots + N_K$; K exponential tables, each of the exponential tables for receiving one of the K parts divided from the fractional part, and outputting a result; and a multiplier for receiving all results from the exponential tables and outputting the mantissa of the exponential calculating result; wherein the integer part output from the transforming device is the exponent of the exponential calculating result, and the sign of the exponential calculating result is 0 and N, K, $N_1, N_2, \ldots, N_K$ are natural numbers.

Furthermore, the invention provides a method for calculating an exponential calculating result for a base 2 floating-point number wherein the floating-point number is represented in the format of $(-1)^{S_x} \cdot 2^{E_x} \cdot m_x$, where $S_x$ is a sign of the floating-point number, $E_x$ is an exponent of the floating-point number, $m_x$ is a mantissa of the floating-point number, and $1 \leq m_x < 2$, the method comprising the steps of: inputting the sign of the floating-point number, the exponent of the floating-point number, and the mantissa of the floating-point number to a transforming device; transforming the floating-point number to an integer part and a fractional part in the transforming device, wherein the fractional part is an N-bit number divided into K parts which have $N_1, N_2, \ldots, N_K$ bits respectively, wherein $N = N_1 + N_2 + \ldots + N_K$; receiving each of K parts divided from the fractional part into an exponential table and outputting a result; inputting all results from the exponential tables to a multiplier to produce a mantissa; and using the mantissa, the integer part and a sign whose value is 0 to represent the exponential calculating result, which is represented in the following format: $(-1)^{S_y} \cdot 2^{E_y} \cdot m_y$, where $S_y$ is the sign whose value is 0, $E^y$ is the integer part, $m^y$ is the mantissa and $1 \leq m_y < 2$.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE PREFERRED EMBODIMENT

Figure 1:
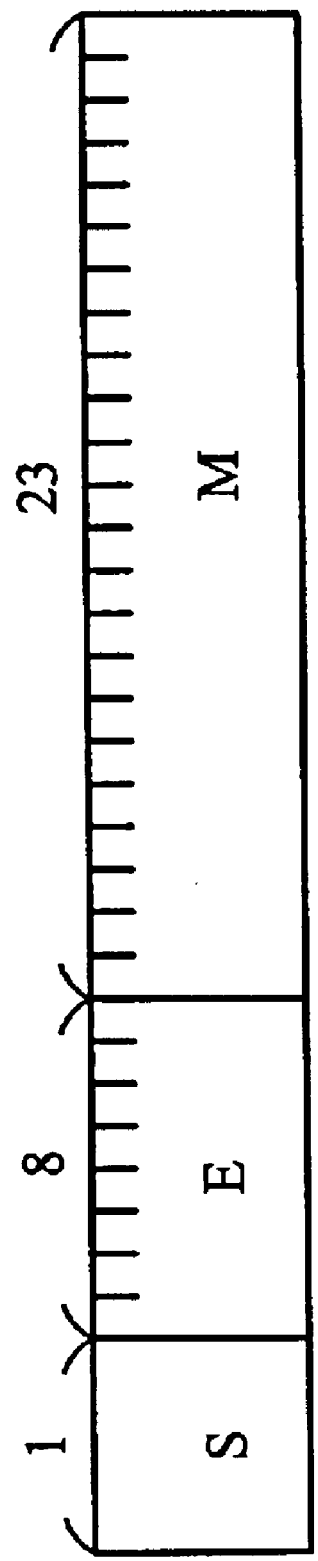
FIG. 1 is a diagram showing the form of the single format.
Figure 2:
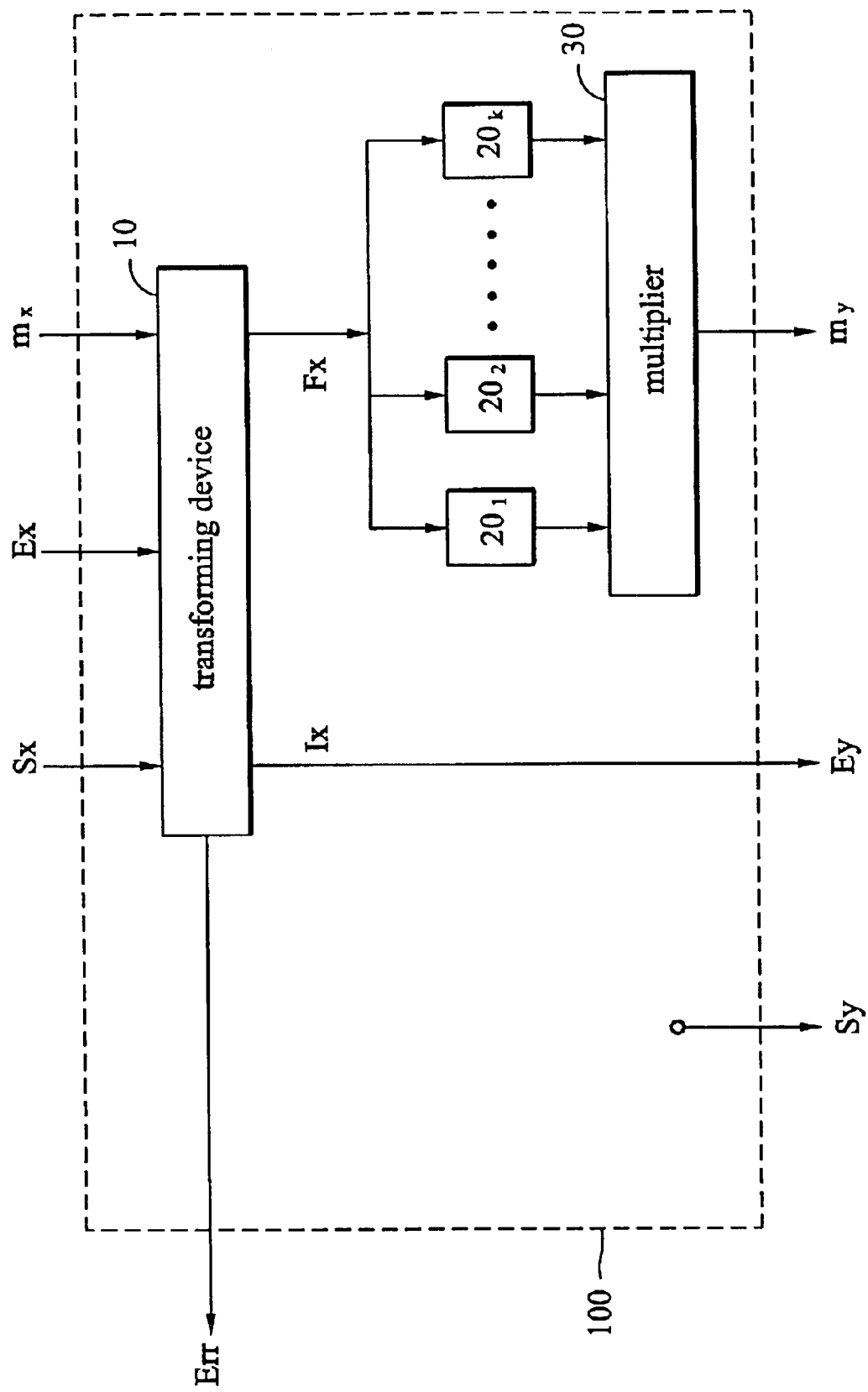
FIG. 2 is a schematic diagram showing the apparatus for calculating an exponential calculating result of a floating-point number according to the present invention.

FIG. 2 is a schematic diagram showing the apparatus for calculating an exponential calculating result of a floating-point number according to the present invention. The apparatus 100, as shown in FIG. 2, comprises a transforming device 10, a plurality of exponential tables $20_1 \sim 20_K$, and a multiplier 30. The transforming device 10 receives a sign of a floating-point number (X) $S_x$, an exponent of the floating-point number (X) $E_x$, and a mantissa of the floating-point number (X) $m_x$. The transforming device 10 transforms the floating-point number X to an integer part $I_x$ and a fractional part $F_x$ and outputs them. Besides, the transforming device 10 outputs an error signal Err if not successful in transforming the floating-point number X to the integer part $I_x$ and the fractional part $F_x$. The fractional part $F_x$ is an N-bit number and is divided into K parts which have $N_1, N_2, \ldots, N_K$ bits respectively, wherein $N=N_1+N_2+ \ldots +N_K$. Each of the exponential tables $20_1 \sim 20_K$ receives one of the K parts divided from the fractional part $F_x$ and outputs a result. The exponential tables $20_1 \sim 20_K$ are predetermined exponential tables for calculating the exponential base-2. The multiplier 30 receives all results from the exponential tables $20_1 \sim 20_K$ and outputs a mantissa of a exponential calculating result (Y) $m_y$. Moreover, the integer part $I_x$ output from the transforming device 10 is an exponent of the exponential calculating result (Y) $E_y$. The exponential calculating result Y is a positive number. Therefore, a sign of the exponential calculating result (Y) $S_y$ is 0.

The floating-point number X is represented in the following format:

$$X=(-1)^{S_x} \cdot 2^{E_x} \cdot m_x \quad (1)$$

where $S_x$ is the sign of the floating-point number X, when the floating-point number X is a positive number, the sign $S_x$ is 0, when the floating-point number X is a negative number, the sign $S_x$ is 1, $E_x$ is the exponent of the floating-point number X, $m_x$ is the mantissa of the floating-point number X and $1 \leq m_x < 2$.

The present invention is used to calculate an exponential calculating result Y for the base 2 floating-point number X, the exponential calculating result Y is given by $$Y=2^X=(-1)^{S_y} \cdot 2^{E_y} \cdot m_y \quad (2)$$

where $S_y$ is the sign of the exponential calculating result Y, and hence the exponential calculating result Y is a positive number, $S_y$ is 0, $E_y$ is the exponent of the exponential calculating result Y, $m_y$ is the mantissa of a exponential calculating result Y and $1 \leq m_y < 2$.

To find Y, the first step in the present invention is to divide X into integer part and a fractional part.

$$X=(-1)^{S_x} \cdot 2^{E_x} \cdot m_x = I_x + F_x \quad (3)$$

where $I_x$ is the integer part and $F_x$ is the fractional part.

$$F_x = q \cdot 2^{-N} = (\sum A_1 \cdot 2^{N_1}) \cdot 2^{-N} \quad (4)$$

where q is a N-bit number, and $A_i$ is a $N_i$-bit number.

$$Y = 2^{I_x + F_x} = 2^{I_x} \times \left[ \prod_1 2^{A_1 2^{N_1 - N}} \right] \quad (5)$$

That is, the sign, exponent and mantissa of Y would be:

$$E_y = I_x \quad (6)$$

$$m_y = 2^{F_x} = \prod_1 2^{A_1 \cdot 2^{N_i - N}} = \prod_1 T_i \quad (7)$$

$$S_y = 0 \quad (8)$$

where $T_i = \prod_1 2^{A_1 \cdot 2^{N_i - N}}$, and $1 \leq i \leq K$, K is the number of the exponential tables, and $0 \leq F_x < 1 \to 2^0 \leq 2^{F_x} < 2^1 \to 1 \leq 2^{F_x} < 2 \to 1 \leq m_y < 2$.

The present invention is used to calculate an exponential calculating result Y for the base 2 floating-point number X. First, the sign of the floating-point number $S_x$, the exponent of the floating-point number $E_x$, and the mantissa of the floating-point number $m_x$ are inputted to the transforming device 10. Then, the floating-point number X is transformed to the integer part $I_x$ and the fractional part $F_x$ by the transforming device 10 (referring to the equation 3). The fractional part $F_x$ is an N-bit number and is divided into K parts which have $N_1, N_2, \ldots, N_K$ bits respectively, wherein $N=N_1+N_2+ \ldots +N_K$. Then, each of the exponential tables $20_1 \sim 20_K$ receives one of the K parts divided from the fractional part $F_x$ and outputs a result. When the i-th exponential table receives the i-th part $A_i$ with $N_i$ bits of the parts divided from the fractional part with N bits, the result $T_i$ for outputting is: $T_i = 2^{A_i \times 2^{N_1 - N}}$, where i is a natural number. The multiplier 30 receives all results from the exponential tables $20_1 \sim 20_K$ and outputs the mantissa my (referring to the equation 4, 5, 7). Finally, the exponential calculating result Y is represented by using the mantissa $m_y$, the integer part $I_x$ and a sign $S_y$ whose value is 0. The exponential calculating result Y is represented in the following format: $(-1)^{S_y} \cdot 2^{E_y} \cdot m_y$, where $S_y$ is the sign whose value is 0 (referring to the equation 8), $E_y$ is the integer part $I_x$ (referring to the equation 6), $m_y$ is the mantissa and $1 \leq m_y < 2$.

Figure 3:
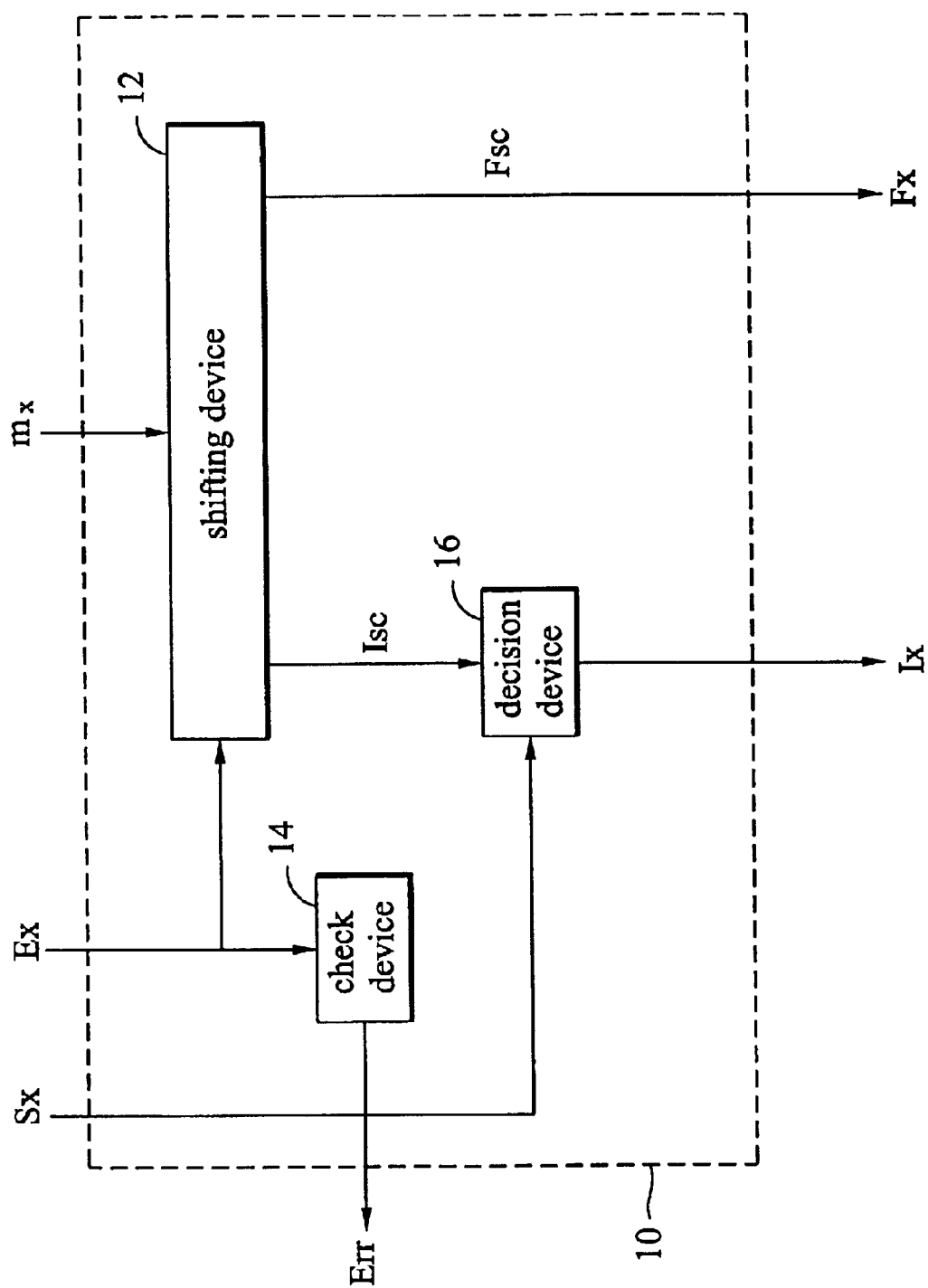
FIG. 3 is a schematic diagram showing the transforming device according to the present invention.

FIG. 3 is a schematic diagram showing the transforming device according to the present invention. The transforming device 10, as shown in FIG. 3, comprises a shifting device 12, a check device 14 and a decision device 16. The shifting device 12 receives the exponent of the floating-point number $E_x$ and the mantissa of the floating-point number $m_x$ and shifts the mantissa of the floating-point number $m_x$ according to the exponent of the floating-point number $E_x$. When the exponent of the floating-point number $E_x$ is a positive number, the mantissa of the floating-point number $m_x$ is shifted left. For example, if the exponent of the floating-point number $E_x$ is 5, the mantissa of the floating-point number $m_x$ is shifted left 5 bits. When the exponent of the floating-point number $E_x$ is a negative number, the mantissa of the floating-point number $m_x$ is shifted right. For example, if the exponent of the floating-point number $E_x$ is $-1$, the mantissa of the floating-point number $m_x$ is shifted right 1 bits. The result of the shifting device 12 is divided into two parts, the integer part and the fraction part, denoted by $I_{SC}$ and $F_{SC}$ respectively.

If the exponent of the floating-point number $E_x$ is too large, the shifting device 12 will be overflowed. The check device 14 checks the value of the exponent of the floating-point number $E_x$ in the shifting device 12 to determine when to output an error signal Err. The decision device 16 receives the integer part $I_{SC}$ and the sign of the floating-point number $S_x$. Besides, the decision device 16 decides the sign of the integer part $I_{SC}$ according to the sign of the floating-point number $S_x$ to produce the integer part $I_x$ for outputting from the transforming device 10. When the sign of the floating-point number $S_x$ is 1, $I_x = -I_{SC}$, otherwise, $I_x = I_{SC}$. The fractional part $F_{SC}$ outputted from transforming device 10 is the fractional part $F_x$.

Figure 4:
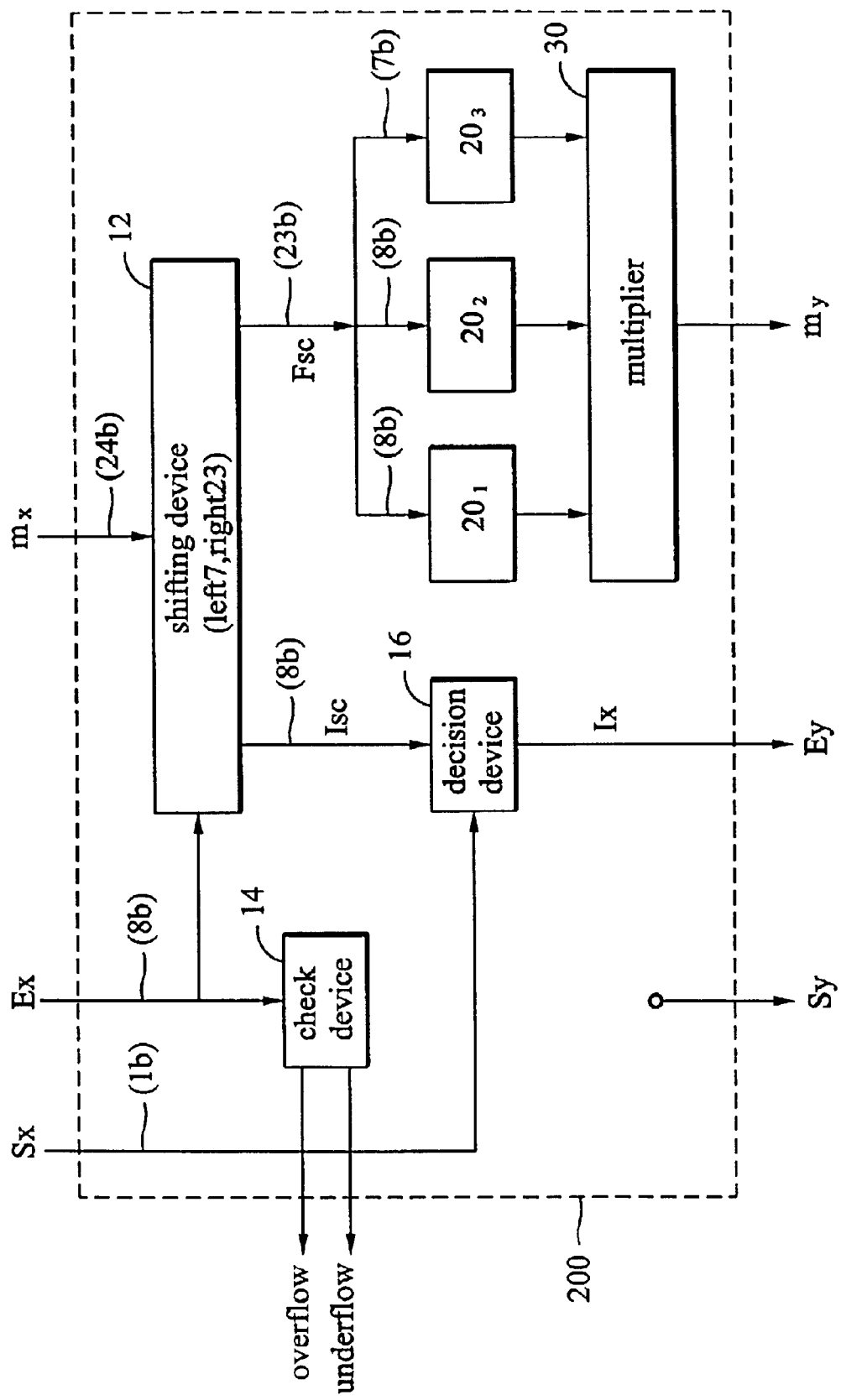
FIG. 4 is a schematic diagram showing the apparatus for calculating an exponential calculating result of a floating-point number according to the embodiment of the present invention.

FIG. 4 is a schematic diagram showing the apparatus for calculating an exponential calculating result of a floating-point number according to the embodiment of the present invention. The apparatus 200, as shown in FIG. 4, comprises a shifting device 12, a check device 14, a decision device 16, three exponential tables $20_1 \sim 20_3$, and a multiplier 30. The embodiment of the present invention is used to calculate an exponential calculating result Y for the base 2 floating-point number X, the exponential calculating result Y being given by: $Y = 2^X$. The floating-point number X is represented in the following format: $X = (-1)^{S_x} \cdot 2^{E_x} \cdot m_x$. $S_x$ is the sign of the floating-point number X with one bit. When the floating-point number X is a positive number, the sign $S_x$ is 0. When the floating-point number X is a negative number, the sign $S_x$ is 1. $E_x$ is the exponent of the floating-point number X with 8 bits. $m_x$ is the mantissa of the floating-point number X with 23 bits and $1 \leq m_x < 2$.

To find the exponential calculating result Y, the first step in the present invention is to divide X into an integer part $I_x$ and a fractional part $F_x$. The integer part $I_x$ is an 8-bit number. The fractional part $F_x$ is a 23-bit number. First, the shifting device 12 receives the exponent of the floating-point number $E_x$ and the mantissa of the floating-point number $m_x$ and shifts the mantissa of the floating-point number $m_x$ according to the exponent of the floating-point number $E_x$. When the exponent of the floating-point number $E_x$ is a positive number, the mantissa of the floating-point number $m_x$ is shifted left. For example, if the exponent of the floating-point number $E_x$ is 5, the mantissa of the floating-point number $m_x$ is shifted left 5 bits. When the exponent of the floating-point number $E_x$ is a negative number, the mantissa of the floating-point number $m_x$ is shifted right. For example, if the exponent of the floating-point number $E_x$ is $-1$, the mantissa of the floating-point number $m_x$ is shifted right 1 bits. The output from the shifting device 12 are the integer part $I_{SC}$ and the fraction part $F_{SC}$.

If the exponent of the floating-point number $E_x$ is too large, the shifting device 12 would be overflowed. The check device 14 checks the value of the exponent of the floating-point number $E_x$ in the shifting device 12 to determine when to output an error signal Err. The error signal Err includes an "overflow" signal and an "underflow" signal. If the exponent of the floating-point number $E_x$ decision is greater than 7, the mantissa of the floating-point number $m_x$ must be shifted left more than 7 bits. Therefore, the check device 14 output the "overflow" signal. If the exponent of the floating-point number $E_x$ decision is smaller than $-23$, the mantissa of the floating-point number $m_x$ must be shifted light more than 23 bits. Therefore, the check device 14 output the "overflow" signal.

The decision device 16 receives the integer part $I_{SC}$ and the sign of the floating-point number $S_x$. The decision device 16 decides the sign of the integer part $I_{SC}$ according to the sign of the floating-point number $S_x$ to produce the integer part $I_x$ for outputting from transforming device 10. When the sign of the floating-point number $S_x$ is 1, $I_x = -I_{SC}$, otherwise, $I_x = I_{SC}$. The fractional part $F_{SC}$ outputted from the shifting device 12 is the fractional part $F_x$ and the integer part $I_x$ is an exponent of the exponential calculating result (Y) $E_y$ (referring to the equation 6).

The fractional part $F_x$ is a 23-bit number and is divided into 3 parts which have 8, 8 and 7 bits respectively and where $23 = 8 + 8 + 7$. Each of the exponential tables $20_1 \sim 20_3$ receives one of the three parts divided from the fractional part $F^x$ and looks up the table to output a result. The multiplier 30 receive all results from the exponential tables $20_1 \sim 20_3$ and output a mantissa of the exponential calculating result (Y) $m_y$.

Referring to the equation 7:

$$m_y = 2^{F_x} = \prod_1 2^{A_1 \cdot 2^{N_i - N}} = \prod_1 T_1$$

In the embodiment, $1 \leq i \leq 3$ and 3 is the number of the exponential tables.

$$m_y = \prod_1 T_1 = T_1 \times T_2 \times T_3 = 2^{A_1 \cdot 2^{-8}} \times 2^{A_2 \cdot 2^{-16}} \times 2^{A_3 2^{-23}} \quad (9)$$

where $T_1 = 2^{A_1 2^{-8}}$, $A_1$ is the first part of the three parts divided from the fractional part $F_x$ and is a 8-bit number; $T_2 = 2^{A_2 2^{-16}}$, $A_2$ is the second part of the three parts divided from the fractional part $F_x$ and is a 8-bit number; $T_3 = 2^{A_3 \cdot 2^{-23}}$, $A_3$ is the third part of the three parts divided from the fractional part $F_x$ and is a 7-bit number.

Moreover, the exponential calculating result Y is a positive number. Therefore, a sign of the exponential calculating result (Y) $S_y$ is 0.

Finally, the exponential calculating result Y is represented by using $m_y$, $E_y$ and $S_y$. The exponential calculating result Y is represented in the following format: $(-1)^{S_y} \cdot 2^{E_y} \cdot m_y$, where $S_y$ is the sign of the exponential calculating result, $E_y$ is the exponent of the exponential calculating result, $m_y$ is a mantissa of the exponential calculating result and $1 \leq m_y < 2$.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An apparatus for calculating an exponential calculating result for a base 2 floating-point number wherein the floating-point number is represented in the format of $(-1)^{S_x} \cdot 2^{E_x} \cdot m_x$ and the exponential calculating result Y is represented in the format of $(-1)^{S_y} \cdot 2^{E_y} \cdot m_y$, where $S_x$ is a sign of the floating-point number, $S_y$ is a sign of the exponential calculating result, $E_x$ is an exponent of the floating-point number, $E_y$ is an exponent of the exponential calculating result, $m_x$ is a mantissa of the floating-point number, $m_y$ is a mantissa of the exponential calculating result, $1 \leq m_x < 2$ and $1 \leq m_y < 2$, the apparatus comprising:

a transforming device for receiving the sign of a floating-point number, the exponent of the floating-point number and the mantissa of the floating-point number, transforming the floating-point number to an integer part and a fractional part, and outputting the integer part and the fractional part, wherein the fractional part is an N-bit number and divided into K parts which have $N_1$, $N_2$, ..., $N_K$ bits respectively, wherein $N=N_1+N_2+ \ldots +N_K$;

K exponential tables, each of the exponential tables for receiving one of the K parts divided from the fractional part and outputting a result; and a multiplier for receiving all results from the exponential tables and outputting the mantissa of the exponential calculating result;

wherein the integer part outputted from the transforming device is the exponent of the exponential calculating result, the sign of the exponential calculating result is 0 and the N, K, $N_1$, $N_2$, ..., $N_K$ are natural numbers.

2. The apparatus for exponential computation as claimed in claim 1, wherein the transforming device comprises:

a shifting device for receiving the exponent of the floating-point number and the mantissa of the floating-point number, shifting the mantissa of the floating-point number according to the exponent of the floating-point number, producing a shifting integer part and a shifting fractional part and outputting the shifting integer part and the shifting fractional part; and a decision device for receiving the shifting integer part and the sign of the floating-point number and deciding the sign of the shifting integer part according to the sign of the floating-point number to produce the integer part.

3. The apparatus for exponential computation as claimed in claim 2, wherein the transforming device further comprises a check device for checking the value of the exponent of the floating-point number in the shifting device to determine when to output an error signal.

4. The apparatus for exponential computation as claimed in claim 2, wherein the shifting fractional part is the fractional part.

5. The apparatus for exponential computation as claimed in claim 2, wherein a value of the shifting fractional part is between 0 and 1.

6. The apparatus for exponential computation as claimed in claim 1, wherein a value of the fractional part is between 0 and 1.

7. The apparatus for exponential computation as claimed in claim 1, wherein the exponential tables are predetermined exponential tables for calculating the exponential base-2.

8. The apparatus for exponential computation as claimed in claim 1, wherein the i-th exponential table receives the i-th part $A_i$ with $N_i$ bits of the parts divided from the fractional part with N bits, and the result $T_i$ for outputting is:

$$T_i = 2^{A_i \times 2^{N_i - N}},$$

where i is a natural number.

9. The apparatus for exponential computation as claimed in claim 1, wherein when the floating-point number is a positive number, the sign of the floating-point number is 0 and when the floating-point number is a negative number, the sign of the floating-point number is 1.

10. The apparatus for exponential computation as claimed in claim 1, wherein the sign of the exponential calculating result is 0 because the exponential calculating result is a positive number.

11. An method for calculating an exponential calculating result for a base 2 floating-point number wherein the floating-point number is represented in the format of $(-1)^{S_x} \cdot 2^{E_x} \cdot m_x$, where $S_x$ is a sign of the floating-point number, $E_x$ is an exponent of the floating-point number, $m_x$ is a mantissa of the floating-point number, and $1 \leq m_x < 2$, the method comprising the steps of:

inputting the sign of the floating-point number, the exponent of the floating-point number, and the mantissa of the floating-point number to a transforming device;

transforming the floating-point number to a integer part and a fractional part in the transforming device, wherein the fractional part is an N-bit number and divided into K parts which have $N_1$, $N_2$, ..., $N_K$ bits respectively, wherein $N=N_1+N_2+ \ldots +N_K$;

receiving each of K parts divided from the fractional part into an exponential table and outputting a result;

inputting all results from the exponential tables to a multiplier to produce a mantissa; and using the mantissa, the integer part and a sign whose value is 0 to represent the exponential calculating result, which is represented in the following format: $(-1)^{S_y} \cdot 2^{E_y} \cdot m_y$, where $S_y$ is the sign whose value is 0, $E_y$ is the integer part, $m_y$ is the mantissa and $1 \leq m_y < 2$.

12. The method for exponential computation as claimed in claim 11, wherein transforming the floating-point number to a integer part and a fractional part in the transforming device comprises the sub-steps:

receiving the exponent of the floating-point number and the mantissa of the floating-point number to a shifting device, shifting the mantissa of the floating-point number according to the exponent of the floating-point number to produce a shifting integer part and a shifting fractional part, and outputting the shifting integer part and the shifting fractional part; and receiving the shifting integer part and the sign of the floating-point number to a decision device and deciding the sign of the shifting integer part according to the sign of the floating-point number to produce the integer part.

13. The method for exponential computation as claimed in claim 12, wherein transforming the floating-point number to a integer part and a fractional part in the transforming device further comprises the sub-steps:

checking the value of the exponent of the floating-point number in a shifting device to determine when to output an error signal.

14. The method for exponential computation as claimed in claim 12, wherein the shifting fractional part is the fractional part.

15. The method for exponential computation as claimed in claim 12, wherein a value of the shifting fractional part is between 0 and 1.

16. The method for exponential computation as claimed in claim 11, wherein a value of the fractional part is between 0 and 1.

17. The method for exponential computation as claimed in claim 11, wherein the exponential tables are predetermined exponential tables for calculating the exponential base-2.

18. The method for exponential computation as claimed in claim 11, wherein the i-th exponential table receives the i-th part $A_i$ with $N_i$ bits of the parts divided from the fractional part with N bits, and the result $T_i$ for outputting is:

$$T_i = 2^{A_i \times 2^{N_i - N}},$$

where i is a natural number.

19. The method for exponential computation as claimed in claim 11, when the floating-point number is a positive number, the sign of the floating-point number is 0 and when the floating-point number is a negative number, the sign of the floating-point number is 1.

20. The method for exponential computation as claimed in claim 11, wherein the sign of the exponential calculating result is 0 because the exponential calculating result is a positive number.

* * * * *